(12) United States Patent
Ohmi et al.

(10) Patent No.: US 7,219,533 B2
(45) Date of Patent: May 22, 2007

(54) SMALL HOLE DIAMETER AUTOMATIC MEASURING APPARATUS, SMALL HOLE DIAMETER MEASUREMENT METHOD, AND SHOWER PLATE MANUFACTURING METHOD

(75) Inventors: Tadahiro Ohmi, 1-17-301, Komegahukuro 3-chome, Aoba-ku, Sendai-shi, Mayagi (JP); Masaaki Nagase, Osaka (JP); Ryousuke Dohi, Osaka (JP); Kouji Nishino, Osaka (JP); Osamu Nakamura, Osaka (JP); Tomio Uno, Osaka (JP); Nobukazu Ikeda, Osaka (JP)

(73) Assignees: Fujikin Incorporated, Osaka (JP); Tadahiro Ohmi, Miyagi (JP)

( * ) Notice: Subject to any disclaimer, the term of this patent is extended or adjusted under 35 U.S.C. 154(b) by 59 days.

(21) Appl. No.: 11/015,097

(22) Filed: Dec. 16, 2004

(65) Prior Publication Data

US 2005/0257603 A1    Nov. 24, 2005

(30) Foreign Application Priority Data

Jan. 9, 2004    (JP)    ............................. 2004-003718

(51) Int. Cl.
*G01M 3/02*    (2006.01)
(52) U.S. Cl. ...................................... 73/37.9
(58) Field of Classification Search ................ 73/37.9, 73/37, 37.5, 35.7; 33/543.1
See application file for complete search history.

(56) References Cited

U.S. PATENT DOCUMENTS

| | | | | |
|---|---|---|---|---|
| 2,490,375 A | * | 12/1949 | Rupley | ...................... 33/543.1 |
| 3,097,521 A | * | 7/1963 | Dega | ............................... 73/40 |
| 3,508,432 A | * | 4/1970 | Bray et al. | ................... 73/37.8 |
| 3,751,971 A | * | 8/1973 | Wilcox | ....................... 73/37.9 |
| 4,027,525 A | * | 6/1977 | Mull | ............................. 73/37 |
| 4,490,316 A | * | 12/1984 | Satzler | ...................... 264/40.7 |
| 4,574,617 A | * | 3/1986 | Hetznecker et al. | ......... 73/37.9 |
| 5,207,089 A | * | 5/1993 | Abt et al. | ....................... 73/37 |
| 5,808,188 A | * | 9/1998 | Chriswell et al. | ........... 73/118.2 |
| 6,471,779 B1 | * | 10/2002 | Nishio et al. | ................ 118/724 |
| 6,901,797 B2 | * | 6/2005 | Hyatt et al. | .................. 73/37.5 |
| 6,925,854 B2 | * | 8/2005 | Neumann | ....................... 73/37 |

FOREIGN PATENT DOCUMENTS

| | | |
|---|---|---|
| JP | 4-502666 | 5/1992 |
| JP | 2003-065742 | 3/2003 |
| JP | 200365742 A * | 3/2003 |

* cited by examiner

*Primary Examiner*—Michael Cygan
(74) *Attorney, Agent, or Firm*—Koda & Androlia

(57) ABSTRACT

A small hole diameter measuring apparatus including: a flow rate measurement section comprised of an automatic pressure control device which supplies a fluid to the inlet side of small holes in a plate while maintaining the outlet- and inlet-side pressures of the small holes in the critical state of the fluid and controlling the inlet-side pressure to a predetermined inlet-side pressure; a plate holding section comprised of a plate supporting device which rotatably holds the plate, and a test probe supporting device which supports a test probe so that the test probe is moved vertically and horizontally; and a control section comprised of a calculation and judgment part, which calculates the hole diameter during the supply of the fluid based upon the measured value of the flow rate from the flow rate measurement section, and an external output part, which outputs the calculated value to the outside.

17 Claims, 8 Drawing Sheets

SMALL HOLE DIAMETER AUTOMATIC MEASURING APPARATUS, SMALL HOLE DIAMETER MEASUREMENT METHOD, AND SHOWER PLATE MANUFACTURING METHOD

BACKGROUND OF THE INVENTION

1. Technical Field

The present invention relates to the measurement of the diameters of small holes formed in a substrate and more specifically relates to an improved system for the automatic measurement of the diameters of small holes formed in a plate such as the orifice diameter of a shower plate used for the disperse supply of a fluid (gas) in, for example, the vacuum chamber of a semiconductor manufacturing apparatus or the like. More concretely, the present invention relates to a small hole diameter measurement system for a plate in which the effective internal diameters of a plurality of small holes formed in a single plate can be automatically measured quickly and with high precision.

2. Description of the Related Art

In semiconductor manufacturing equipment and liquid crystal displays, due to an increase in the size of the materials that are treated, it is necessary to maintain in-plane uniformity. Accordingly, for example, in vacuum chambers used in semiconductor manufacture, a technique is generally practiced in which a plate having numerous small holes is disposed in the inside upper part of the chamber, and various treatment gases are supplied to the top of the material being treated (e.g., silicon wafer) via this plate.

A plate of this type is ordinarily formed from a stainless steel material, ceramic material or the like with a thickness of approximately 3 to 30 mm and an external diameter of approximately 100 mm to 300 mm. Approximately 20 to 100 small holes having a circular cross-sectional shape with an internal diameter of approximately 50 µm to 3000 µm are formed either regularly or irregularly in this plate.

The above-described small holes are formed by mechanical working or chemical working, and the working precision is restricted to a precision of ±1 µm (error dimension) or better.

Since the diameter of the small holes in the above-described plate is directly related to the amount of treatment gas that is caused to jet into the chamber, this diameter must be strictly controlled; and various techniques for this have been developed in the past.

Among these techniques, (a) a method in which compressed air is supplied from one end of the small holes, and the internal diameter of the small holes is detected from the variation in the air back pressure on the outlet side of the small holes (e.g., Japanese Patent Application Laid-Open (Kokai) No. 2003-65742), and (b) a method in which the diameter of the small holes is detected from the flow rate of the gas that flows through the small holes (e.g., Japanese National Patent Publication No. H4-502666), have attracted attention as techniques that can be adapted for practical use.

However, in the case of the method of (a) described above, the direct object of the method is the measurement of the internal diameter of a pipe-form body that has a relatively small diameter; accordingly, in cases where the object of measurement consists of small holes with a circular cross-sectional shape that are formed in a plate, since the length of the small holes is relatively short, the following problem arises: namely, the pressure on the outlet side of the small holes (back pressure) cannot be measured simply and with a high degree of precision.

Meanwhile, in the case of the latter method of (b), as shown in FIG. 8, an air current is caused to flow into the small holes that are the object of detection under critical conditions, the temperature of the air current is measured by a temperature detection device, the flow rate of the air is measured by a differential type flow meter, and the effective cross-sectional area of the small holes is calculated using the above-described measured value of the air flow rate and the above-described measured value of the air temperature.

In FIG. 8, the reference numeral 20 indicates a filter, 21 indicates a differential type flow rate measuring device in which numerous tube bodies 22 are combined side by side, 23 indicates the small holes that constitute the object of detection, 24 indicates a vacuum pump, 25 indicates a pressure gauge, and 26 indicates a thermometer.

In the measurement of the internal diameter of the small holes 23, first the air flow-through system is placed under so-called critical conditions by operating the vacuum pump 24 ($P_1/P_2>2$), the flow rate VE of the air that flows through the small holes 23 is measured by means of a differential type flow rate measuring device 21, and the air temperature T is measured.

The cross-sectional area A of the small holes is next calculated from the respective measured values using the following formula:

$$A=K'\cdot VE\cdot[1-0.0017(T-20)]$$

wherein, K' is a constant, VE is the measured value of the volumetric flow rate of the air, and T is the air temperature (° C.).

However, the method of (b) described above has a problem: a so-called differential type flow meter is used in which the volumetric flow rate VE of the air is calculated using the differential pressure ΔP of laminar flow regions that are formed by combining numerous tube bodies 22 side by side; accordingly, the construction of the flow meter itself becomes complicated, and it is difficult to measure the volumetric flow rate VE of the air with a high degree of precision.

Furthermore, in the method of (b) described above, the cross-sectional area A of the small holes 23 is calculated using a formula as described above. However, in cases where the length dimension of the small holes 23 is relatively long (e.g., 3 to 10 mm), and a plurality of areas where the cross-sectional area A varies are present in the longitudinal direction of the small holes, it becomes difficult to measure the cross-sectional area A of the small holes 23 accurately using the formula described above because of the effects of the viscosity of the air current and like, and it has been demonstrated that a large error is generated in verification tests conducted by the inventors of the present application.

Moreover, in the case of the method of (b), the replacement of the small holes 23 that constitute the object of inspection takes time and trouble; accordingly, if the object of inspection is numerous small holes formed in a plate, it is difficult to measure the internal diameter of the small holes efficiently and with a high degree of precision.

In addition, in the case of the method of (b), absolutely no consideration is given to the automatic replacement of the small holes 23 that constitute the object of inspection or the processing of the measured small hole diameter results (e.g., ascertaining the acceptability of the inspection results for the small hole diameters or transmission of the results of such evaluation); accordingly, such a method cannot easily be applied to actual semiconductor manufacturing plants.

Furthermore, it is difficult to control the flow rate of the gas that flows out of the small holes with a high degree of precision merely by controlling the internal diameter of the small holes. The reason for this is that the gas flow rate fluctuates greatly not only according to the internal diameter of the small holes, but also according to the degree of roundness, depth, presence or absence of a taper, and the like.

BRIEF SUMMARY OF THE INVENTION

The primary object of the present invention is to solve at least one of the problems described above that are encountered in the conventional small hole diameter measurement methods in which the flow rate of a fluid that passes through the small holes is measured, and the equivalent cross-sectional area A of the small holes is detected (calculated) from the measured value of this flow rate, such problems being:

(1) the fact that the flow meter itself is complicated since a differential type flow meter equipped with laminar flow regions is used, (2) the fact that the effective cross-sectional area A of the small holes cannot be accurately calculated from the measured value of the flow rate in the case of small holes with a relatively small length dimension such as small holes formed in a plate, (3) the fact that measurement of the diameter of small holes cannot be performed quickly and efficiently in the case of small holes formed in a plate, (4) the fact that handling of the processing and transmission of the measured values of small hole diameters is imperfect, so that application to actual semiconductor manufacturing plants is difficult, and the like.

In other words, the primary object of the present invention is to provide a small hole diameter automatic measurement system for a plate in which the diameters of a plurality of small holes formed in a plate can be quickly and accurately measured (or detected), an automatic judgment can be made as to whether or not the detected small hole diameters (or effective cross-sectional areas) are within a permissible range, and the judgment results can be transmitted in real-time to an arbitrary location.

The present invention provides a small hole diameter measuring apparatus for a plate which successively and continuously measures the diameters of a plurality of small holes formed in a plate, and the basic construction of the present invention is that the apparatus comprises:

a flow rate measurement section B substantially comprising an automatic pressure control device 4 which supplies a fluid to the inlet side of small holes 8 in a plate 7 while maintaining the outlet-side pressure $P_2$ of the small holes 8 and the inlet-side pressure $P_1$ of the small holes 8 in the critical state of the fluid, and controlling the inlet-side pressure $P_1$ to a desired predetermined inlet-side pressure $P_1$, a plate holding section D comprising a plate supporting device 12 which holds the above-described plate 7 so that the plate 7 is free to rotate, a test probe supporting device 13 which supports a test probe 6 that is in air-tight contact with the inlet side of the above-described small holes 8 above, and that supplies a fluid from the flow rate measurement section B, so that the test probe 6 can be freely raised and lowered and freely moved in the horizontal direction, and control devices 14 and 15 for both of the above-described supporting devices 12 and 13, and a control section C comprising a calculation and judgment part $C_2$ which calculates the hole diameter or cross-sectional area of the small holes 8 during the supply of the fluid on the basis of the measured value of the flow rate from the above-described flow rate measurement section B, and an external output part $C_3$ which outputs this calculated value to the outside of the control section C.

In the above structure of the present invention, the calculation and judgment part $C_2$ of the control section C is a calculation and judgment part which calculates the cross-sectional area A of the small holes 8 using the numerical formula shown below:

$$A = Qg \cdot (Gg \cdot T)^{1/2} \cdot 17/(203 \cdot P_1 \cdot \alpha o)$$

wherein, Qg is the supply rate ($Nm^3/h$) of the fluid to the small holes converted into a standard state, $P_1$ is the absolute pressure ($kgf/cm^2$ abs) of the fluid on the inlet side of the small holes, T is the temperature (K) of the fluid, Gg is the specific gravity of the fluid, and $\alpha o$ is the contraction coefficient of the fluid.

In the above structure of the present invention, the fluid is nitrogen or air, and the contraction coefficient $\alpha o$ is 0.8.

Furthermore, in the above structure of the present invention, the plate supporting device is a plate supporting device with a construction that is open to the atmosphere on the outlet side of the small holes 8 in the plate 7.

In the above structure of the present invention, the plate supporting device 12 is comprised of a plate carrier 12d, a rotational driving motor 12b that causes this plate carrier 12d to rotate intermittently by a specified angular pitch, and a motor control device 14 that controls the above-described driving of the rotational driving motor 12b.

In addition, in the above structure of the present invention, the test probe supporting device 13 is comprised of a car 13b which is supported on a supporting rail 13c so that this car 13b is free to move, a probe supporting body 13a which can be extended and retracted in telescoping form and whose upper end portion is fastened to the above-described car 13b, and a test probe 6 which is fastened to the lower end portion of the above-described probe supporting body 13a.

In the above structure of the present invention, the external output part $C_3$ of the control section C is an external output part which outputs the measured value of the flow rate and the calculated value of the hole diameter or cross-sectional area to the outside of the control section.

In the above structure of the present invention, the test probe 6 comprises a holding body 6a, a retaining member 6b that is fastened to the holding body 6a, a sealing member 6d that is disposed on the lower end surface of the retaining member 6b, and a fluid passage 6e that is formed in the retaining member 6b.

Furthermore, the present invention provides a small hole diameter measuring apparatus which measures the diameters of small holes formed in a substrate, and the basic construction of the present invention is that the apparatus comprises:

a pressure control means for supplying a fluid to the inlet side of the above-described small holes at a desired inlet-side pressure $P_1$ while maintaining the pressure $P_2$ on the outlet side and the pressure $P_1$ on the inlet side of the above-described small holes in the critical state of the fluid, a flow rate measuring means for measuring the flow rate of the fluid that is supplied to the inlet side of the above-described small holes by the above-described pressure control means, and a calculating means for calculating the cross-sectional area A of the small holes using the numerical formula shown below:

$$A = Qg \cdot (Gg \cdot T)^{1/2} \cdot 17/(203 \cdot P_1 \cdot \alpha o)$$

wherein, Qg is the supply rate (Nm$^3$/h) of the fluid to the small holes converted into a standard state, $P_1$ is the absolute pressure (kgf/cm$^2$ abs) of the fluid on the inlet side of the small holes, T is the temperature (K) of the fluid, Gg is the specific gravity of the fluid, and $\alpha o$ is the contraction coefficient of the fluid.

In the above structure of the present invention, the above-described flow rate measuring means include a mass flow controller.

Furthermore, the present invention provides a small hole diameter measurement method for measuring the diameters of small holes formed in a substrate, and the basic construction of the present invention is that the method includes:

a step of supplying a fluid to the inlet side of the above-described small holes at a desired inlet-side pressure $P_1$ by pressure control means while the pressure $P_2$ on the outlet side and the pressure $P_1$ on the inlet side of the above-described small holes are maintained in the critical state of the fluid, a step of measuring the flow rate of the fluid that is supplied to the inlet side of the above-described small holes by above-described the pressure control means, and a step of calculating the cross-sectional area A of the above-described small holes using the numerical formula shown below:

$$A = Qg \cdot (Gg \cdot T)^{1/2} \cdot 17/(203 \cdot P_1 \cdot \alpha o)$$

wherein, Qg is the supply rate (Nm$^3$/h) of the fluid to the small holes converted into a standard state, $P_1$ is the absolute pressure (kgf/cm$^2$ abs) of the fluid on the inlet side of the small holes, T is the temperature (K) of the fluid, Gg is the specific gravity of the fluid, and $\alpha o$ is the contraction coefficient of the fluid.

In the above method of the present invention, the above-described measurement of the flow rate is performed using at least a mass flow controller.

Furthermore, the present invention provides a shower plate manufacturing method that includes a step of forming a specified number of small holes equal to or greater than two with a specified diameter in a specified portion of a plate, and a step of measuring the diameters of the above-described small holes using the small hole diameter measuring apparatus described above.

In addition, the present invention provides a shower plate manufacturing method that includes a step of forming a specified number of small holes equal to or greater than two with a specified diameter in a specified portion of a plate, and a step of measuring the diameters of the above-described small holes using the small hole diameter measurement method described above.

The above methods of the present invention includes a step of determining whether or not the variation in the opening diameter of the specified number of small holes is within a specified range by measuring the above-described hole diameters.

Furthermore, the invention provides a shower plate that is manufactured by the manufacturing methods described above.

In the present invention, a plate is placed on a plate carrier that is free to rotate, and a test probe which is supported above this plate carrier so that this test probe can move in the horizontal direction is lowered toward the fluid inlet side of specified small holes in the plate from above, and the tip end of this test probe presses against the upper surface on the fluid inlet side of the small holes in an air-tight manner. Accordingly, the tip end of the test probe can be automatically connected to the fluid inlet side of the respective small holes in the plate in accordance with a predetermined specified program, and the measurement of the diameters of the small holes can be performed more efficiently.

Furthermore, in the present invention, since a construction that uses an automatic pressure control device and a thermal quantity type mass flow controller having extensive records of use in fluid flow meters is employed, the flow rate of the fluid flowing through the small holes can be measured quickly and accurately.

Furthermore, in the present invention, the diameter of the small holes (effective cross-sectional area of the small holes) is calculated using the relational formula of the "small hole cross-sectional area, Cv value and small hole contraction coefficient $\alpha o$," which has a long record of use in the field of fluid devices. Accordingly, the diameter of the small holes (effective cross-sectional area of the small holes) can be measured with a higher degree of precision. More specifically, in the present invention, the focus is on the effective cross-sectional area of the small holes determined from the Cv value of the small holes and the cross-sectional area A, and the variation between the small holes is controlled using the flow rate of the gas that flows at the same pressure. Accordingly, control can be performed with a higher degree of precision than in cases where the variation between the small holes is controlled using only the internal diameter of the small holes.

In addition, in the present invention, the measurement results for the diameter of the small holes and a predetermined reference value for the diameter of the small holes can be automatically compared, and the results of this comparison can be transmitted to an arbitrary location. Accordingly, control and processing of the measurement results can be performed more efficiently.

BRIEF DESCRIPTION OF THE DRAWINGS

FIG. 7 is a system construction diagram of the small hole diameter measurement system; and.

DETAILED DESCRIPTION OF THE INVENTION

Below, basic experiments forming the foundation of the creation of the present invention will be described along with the results of these experiments, and respective embodiments of the present invention will be described, with reference to the figures.

Figure 1:
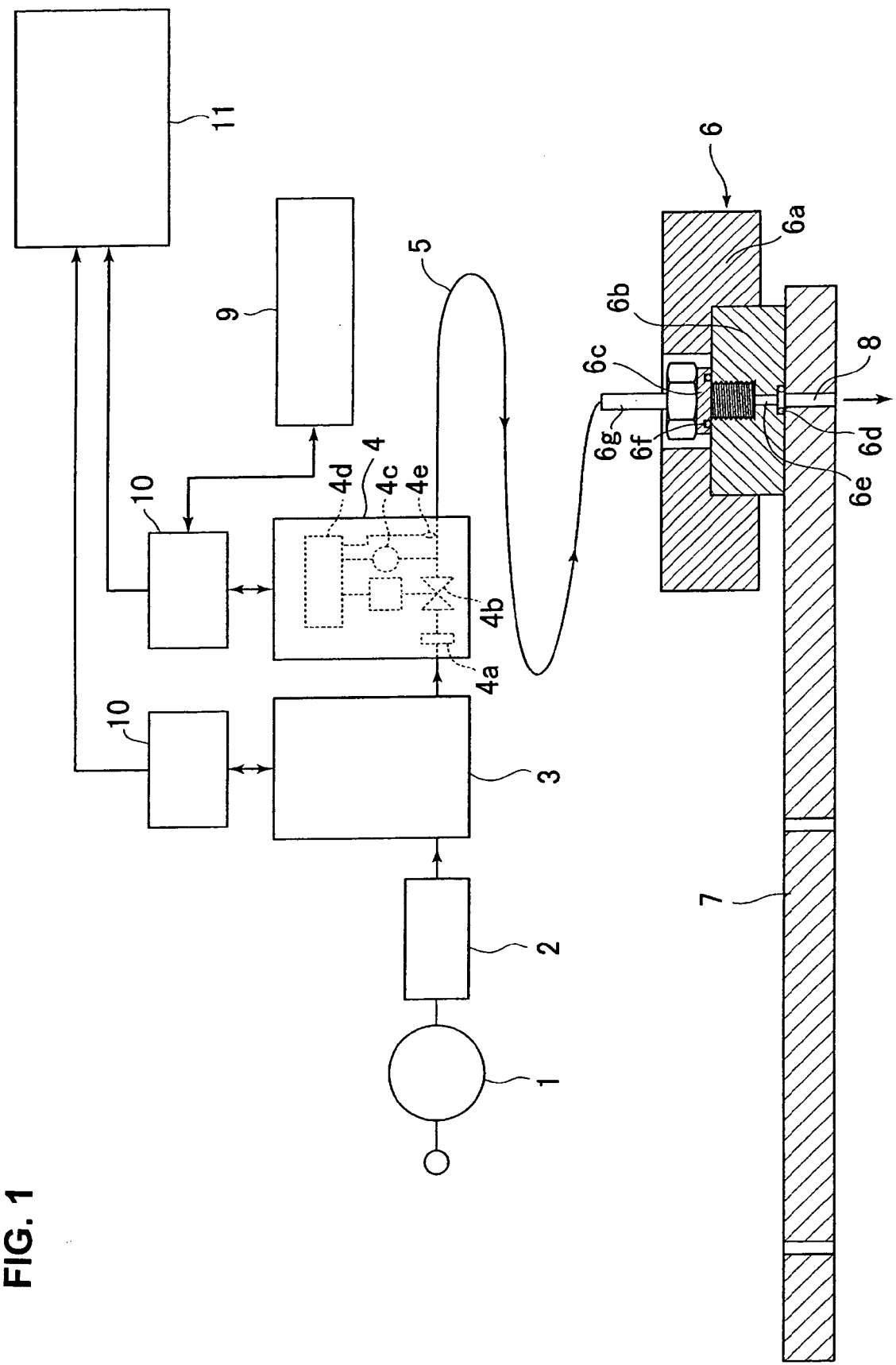
FIG. 1 is a schematic explanatory diagram of the test apparatus used to obtain basic data for the present invention.

FIG. 1 is an outline diagram of a test apparatus used to obtain basic data for the present invention; and in this figure, the reference numeral 1 indicates a pressure adjustment device, 2 indicates a filter, 3 indicates a thermal quantity type mass flow controller (rating: 500 SCCM), 4 indicates an automatic pressure control device, 5 indicates a connecting tube (PFA tube, 3.2 mm φ×3 m), 6 indicates a test probe, 7 indicates a plate, 8 indicates small holes in the plate, 9 indicates an operating control panel, 10 indicates a power supply device, and 11 indicates a pen recorder.

The above-described automatic pressure control device 4 is comprised of a filter 4a, a control valve 4b, a pressure detector 4c, a calculation and control device 4d, a thermistor 4e, and the like; and it has flow rate control characteristics which are such that the flow rate of the fluid passing through the small holes 8 is regulated only by the pressure $P_1$ under so-called critical conditions in which the upstream-side pressure $P_1$ of the small holes 8 in the plate 7 (the pressure $P_1$ inside the tube 5) is approximately twice atmospheric pressure or greater.

Furthermore, the above-described test probe 6 comprises a holding member 6a made of stainless steel, a retaining member 6b made of a synthetic resin, a connecting fitting 6c, sealing members 6d and 6f, and the like. The fluid passage 6e of the connecting fitting 6c and the small holes 8 are connected in an air-tight manner by the sealing member 6d by way of pressing the holding member 6a against the upper surface of the plate 7 from above.

Figure 2:
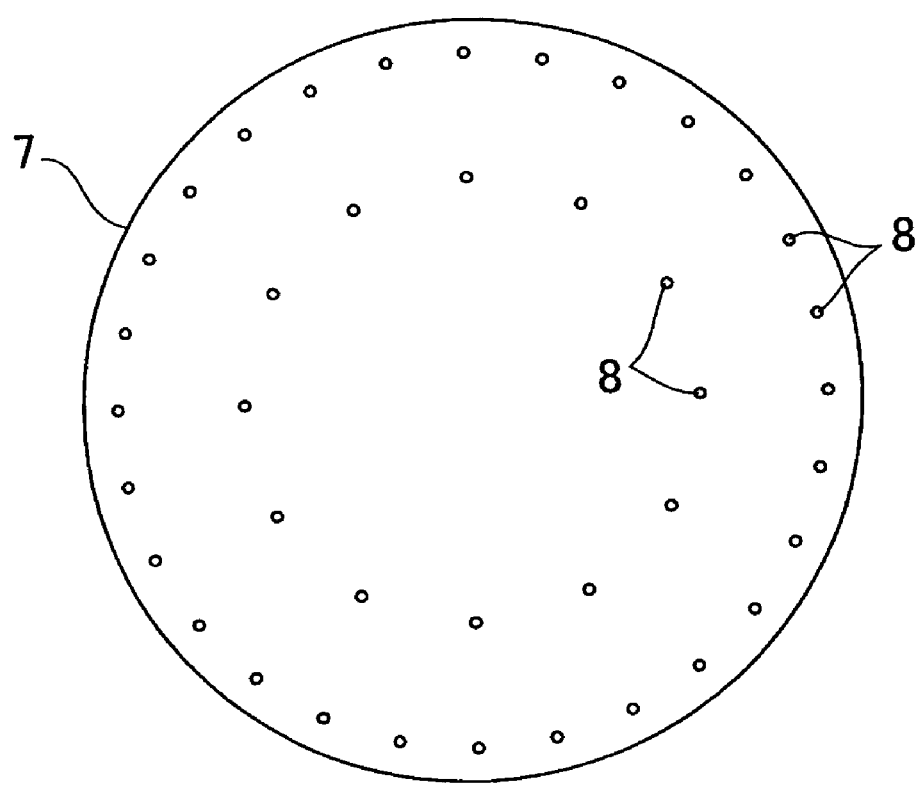
FIG. 2 is a top view of the plate.

As shown in FIG. 2, the above-described plate 7 includes twelve (inside) small holes 8 and 28 (outside) small holes 8 that have a circular cross-sectional shape and are disposed at equal intervals on two concentric circles. The diameter of each small hole 8 is formed with a precision of 100 μm±1 μm (by mechanical working). Furthermore, the thickness t of the plate 7 is set so that t=3 mm to 30 mm.

In the testing, the test probe 6 is first pressed against the inlet end (upper surface of the plate 7) of a specified small hole 8 in the plate 7 in an air-tight manner, and it is fastened in place. Next, a compressed fluid, e.g., compressed air, is supplied from a fluid supply source; and the inflow pressure Po to the filter 2 is adjusted to 500 KPa by means of the pressure adjustment device 1, and a pressure control signal (i.e., control signal of the pressure $P_1$) is sent to the automatic pressure control device 4 from the operating control panel 9, so that the control valve 4b is adjusted, and the upstream-side pressure $P_1$ of the small hole 8 is successively varied. Then, the flow rate (supply flow rate Q) of the fluid passing through the small hole 8 at various upstream-side pressures $P_1$ is measured.

Measurement of the flow rate by means of the thermal quantity type mass flow controller 3 is also performed simultaneously with the operation of the automatic pressure control device 4, and the respective measured values are sent to the pen recorder 11 and automatically recorded.

Figure 3:
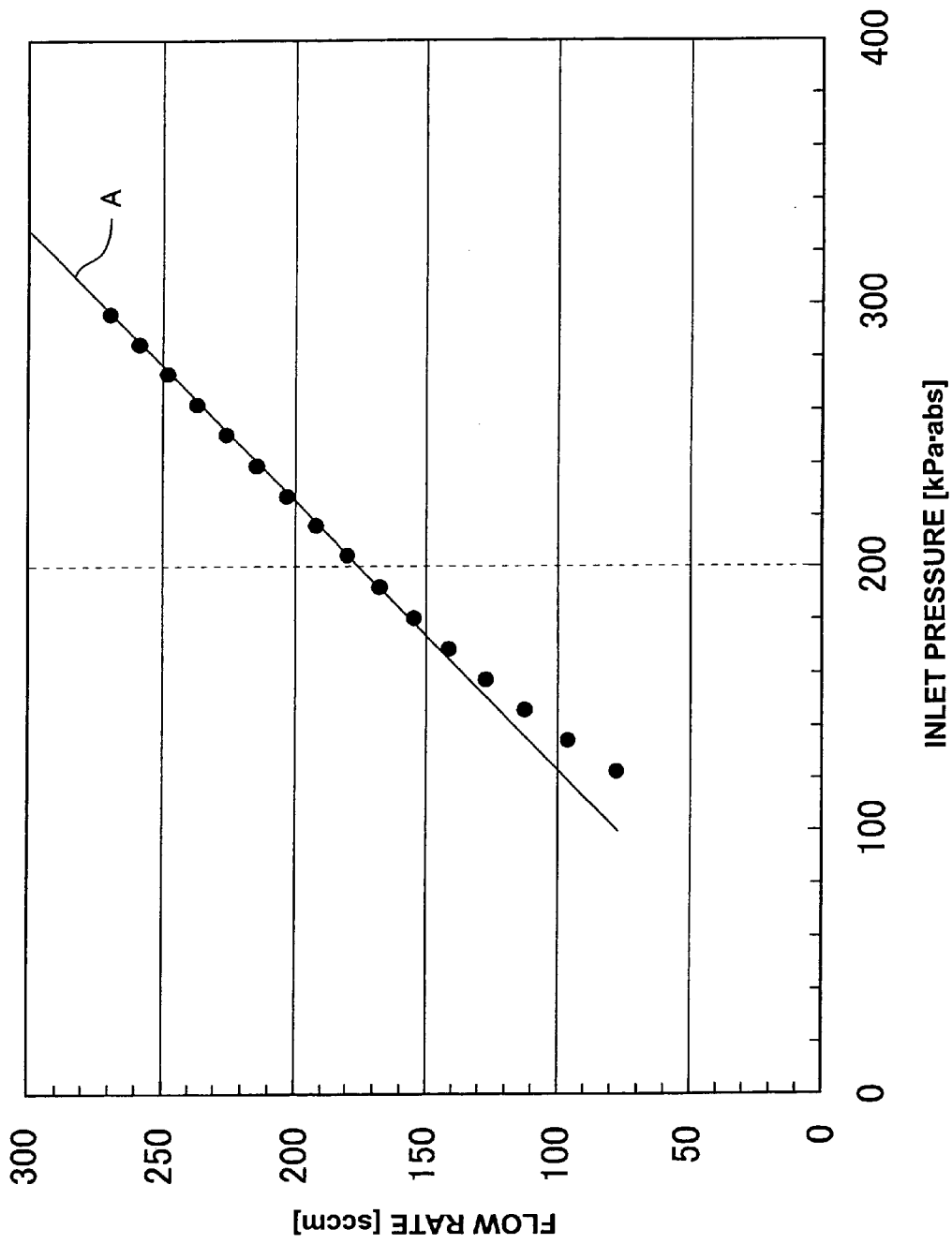
FIG. 3 is a graph showing the test results obtained using the test apparatus shown in FIG. 1.

FIG. 3 shows the results of a test performed by means of the above-described test apparatus shown in FIG. 1. Straight line A shows the flow rate measured by the thermal quantity type mass flow controller 3 when the pressure $P_1$ on the inlet side of the small holes was varied.

Measurements were performed three times each for the pressure $P_1$ on the inlet side of each small hole; and it was confirmed that the flow rate measurement error was 1 SCCM or less in all cases.

As is clear from the straight line A in FIG. 3, as long as the so-called critical conditions with respect to the air current ($P_1/P_2$ (atmosphere)) are satisfied, the amount of air passing through the small holes 8 (the amount of air supplied to the small holes 8) is proportional to the upstream-side pressure $P_1$ of the small holes 8.

It can be confirmed from the results that the flow rate of the air current through the small holes 8 can be accurately measured using the automatic pressure control device 4.

Figure 4:
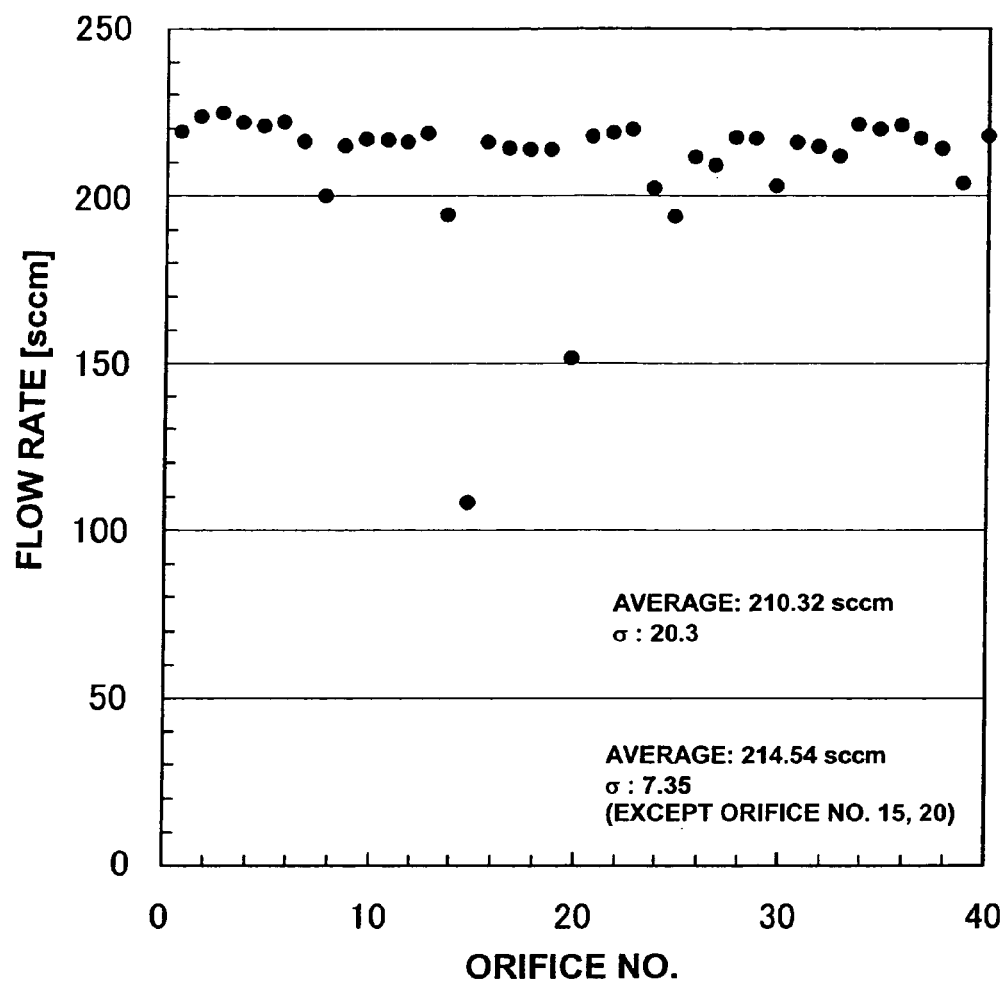
FIG. 4 is a graph showing the results that express the measured values of the flow rate in the test results shown in FIG. 1.

FIG. 4 shows the flow rate measurement values for all of the small holes 8 (a total of 40 holes) formed in the plate 7 in which the measurements were performed using the above-described test apparatus shown in FIG. 1 in a case where the air pressure $P_1$ on the inlet side of the small holes was set at 300 KPa abs.

In the case of No. 15 and No. 20, the measured values greatly differ from those of the other small holes (it is surmised that the diameters of these small holes differ from those of the other small holes because of an aberration caused by human or an aberration in the machining precision). Accordingly, the respective mean flow rates and standard deviations of the small holes were determined for the case in which these values were excluded and a case in which these values were included (values for the former case: 214.54 SCCM, standard deviation σ: 7.35; values for the latter case: 210.32 SCCM, standard deviation σ: 20.3).

Table 1 shows the case in which the actual hole diameter (μm) dimensions of some of the small holes 8 in the plate 7 used in the above-described test shown in FIG. 1 and the air flow-through rate at an inlet-side pressure $P_1$ of 300 KPa abs were measured separately. The hole diameters were measured mechanically by means of a precision hole diameter measuring apparatus, and the air flow-through rate was measured using a thermal quantity type mass flow meter (manufactured by Nippon Aera).

TABLE 1

| Orifice No. | Hole diameter (μm) | Flow-through rate (SCCM) |
| --- | --- | --- |
| 3 | 100 | 224.64 |
| 4 | 101 | 221.79 |
| 5 | 100 | 220.67 |
| 6 | 100 | 221.76 |
| 7 | 100 | 216.14 |
| 9 | 101 | 214.87 |
| 15 | 99 | 108.59 |
| 20 | 100 | 151.57 |

As is clear from No. 15 and No. 20 in Table 1, even though the measured value obtained by a mechanical hole diameter measuring apparatus is approximately 100 μm, a large variation is seen in the air flow-through rate in the case of No. 15 and No. 20. It is surmised that the reason for this is that hole diameter is locally reduced in positions in the depth of the small hole that are removed from the measurement location, so that a reduction in the flow rate occurs as a result.

Indeed, even in the case of such an aberration in the hole diameter (an aberration that cannot be detected by a mechanical type precision hole diameter measuring apparatus), as is clear from FIG. 4 described above, this abnormality in the hole diameter can easily be detected by the method of the present invention (see examples No. 15 and No. 20 in FIG. 4).

If the flow rate of the air passing through the small holes 8 can be measured as described above, the hole diameters, i.e., the effective cross-sectional areas A, of the small holes 8 are next determined from the measured flow rate values.

In the present invention, there is a focus on the relational formula of $Cv = A/17$         Equation (1)

of "the Cv value that indicates the ease of flow of a fluid and the effective cross-sectional area A (mm$^2$) of the fluid flow passage," which is commonly used in the field of liquid fluids such as water. It was envisioned that gaseous fluids could also be handled in the same manner as fluids such as water by multiplying the effective cross-sectional area A (mm$^2$) of this Equation (1) by the contradiction coefficient αo to produce an equation of the type Cv=αoA/17 . . . Equation (2), and this was to be confirmed by experiment.

Incidentally, the relational equation $$Cv = A/17 \quad \text{Equation (1)}$$

between "the Cv value that indicates the ease of flow of a liquid fluid such as water and the effective cross-sectional area A (mm$^2$) of the fluid flow passage" described above is obtained via the process described below.

More specifically, considering a small hole through which a fluid (water) flows, the calculation formula for the flow rate Q of the fluid passing through this small hole is as follows from the continuous equation of Bernoulli:

$$Q = \alpha Ao \times 10^{-6}(2 \, g/G(P_1 - P_2))^{1/2} \times 10^9 \times 60 \times 60$$
$$= 1.593 \alpha Ao((P_1 - P_2)/G)^{1/2}$$

Here, where GL' is the specific gravity of a liquid (specific gravity relative to water with water taken as 1000), GL'=G/1000. When this relationship is substituted into the equation shown above, the following equation is obtained:

$$Q = 0.0504 \alpha Ao((P_1-P_2)/GL')^{1/2} \quad \text{a}$$

Here, furthermore, assuming that αAo=A (effective cross-sectional area A mm$^2$), then $$Q = 0.0504 A \times ((P_1-P_2)/GL')^{1/2} \quad \text{b}$$

In the respective equations shown above,
Q=flow rate m$^3$/h
$P_1$=small hole inlet pressure (kg/cm$^2$)
$P_2$=small hole outlet pressure (kg/cm$^2$)
Ao=small hole cross-sectional area (mm$^2$)
α=flow rate coefficient (0.65 to 0.95)
g=acceleration of gravity (m/sec$^2$)
G=density of fluid (kg/cm$^3$)
GL'=specific gravity of liquid (relative to water)

Meanwhile, the Cv value is defined as follows: "the numerical value obtained by expressing in gal/min the flow rate in a case where fresh water is caused to flow with the differential pressure between the inlet and outlet of a small hole or the like maintained at 1 psi (0.07 kg/cm$^2$) is taken as the Cv value of this small hole or the like." Accordingly, if this is expressed as an equation, the following is obtained:

$$Q' = Cv((P_1'-P_2')/GL')^{1/2} \quad \text{c}$$

Here, Q'=gal/min, $P_1'$=inlet pressure psi, $P_2'$=outlet pressure psi, 1 gal=3.785 liters, and 1 psi≈0.07 kg/cm$^2$. Accordingly, if the relationships of $$Q' = (Q \times 1000)/(3.785 \times 60) \text{ and}$$

$$P_1'-P_2' = (P_1-P_2)/0.07$$

are substituted into Equation c described above, then the following Equation d in which Equation c is corrected to the metric unit system is obtained:

$$Q = 0.858 Cv((P_1-P_2)/GL')^{1/2} \quad \text{d}$$

Equation d can also be written as $$Cv = 1.165 Q(GL'/\sqrt{(P_1-P_2)})^{1/2} \quad \text{d'}.$$

Here, if Equation b and Equation d described above are compared, 0.0504 A=0.858 Cv is obtained, and the following Equation e is obtained from this:

$$Cv = A/17 \quad \text{e}$$

In other words, this Equation e indicates Equation (1) which expresses the relationship of "the Cv value that indicates the ease of flow of a fluid and the effective cross-sectional area A of the fluid flow passage" in a case where the fluid described above is a liquid fluid (water).

Meanwhile, the Cv value of Equation e described above is a value that is derived from the definition of the Cv value in a case where water is caused to flow through a small hole. Accordingly, in cases where this is applied directly to a gaseous fluid (e.g., air), the value (Cv value) expressing the ease of flow of such a gaseous fluid through a small hole is expressed in the form of the following Equation (3):

$$Cv = Qg \cdot (Gg \cdot T)^{1/2}/(203 \cdot P_1) \quad (3)$$

wherein, Qg is the flow rate of a gas (Nm$^3$/h) in the standard state, $P_1$ is absolute pressure (kgf/cm$^2$ abs) on the upstream side of the small hole, Gg is specific gravity of the gaseous fluid (with air taken as 1), and T is temperature (K) of the gaseous fluid in a case where the gaseous fluid satisfies the critical condition ($P_1/P_2$=2 or greater).

In the present invention, as described above, focus was on the fact that the fluid involved is a gaseous fluid rather than a liquid fluid, and it was discovered that the equation described above, i.e., $$Cv = \alpha o A/17 \quad (2),$$

also holds true with extremely high precision for gas current such as air currents if the effective cross-sectional area A in Equation (1) indicating the relationship between the above-described Cv value and the effective cross-sectional area A of the flow passage in a case where the fluid is water is multiplied by the contraction coefficient αoA, and this αo is set at 0.8 A, i.e., if αo is set at 0.8.

Here, if the above-described Cv value of Equation (3) for a gas current and the above-described Cv value of Equation (2) are coupled, the following equation is obtained:

$$17 \cdot Cv = \alpha o A 17 \cdot Qg \cdot (Gg \cdot T)^{1/2}/(203 \cdot P_1) = \alpha o \cdot A$$

$$A = Qg \cdot (Gg \cdot T)^{1/2} \cdot 17/(203 \cdot P_1 \cdot \alpha o)(\text{mm}^2) \quad (4)$$

The effective cross-sectional area A (mm$^2$) of a small hole 8 through which a gas flows can be determined by calculation, by substituting Qg (the flow rate (Nm$^3$/h) of the gas in a standard state), $P_1$ (the absolute pressure (kgf/cm$^2$ abs) of the gas on the upstream side of the small hole), T (the temperature (K) of the gas), Gg (the specific gravity of the gas (air)=1), and αo (the contraction coefficient (=0.8) in the case of a gas current) in this Equation (4).

Figure 5:
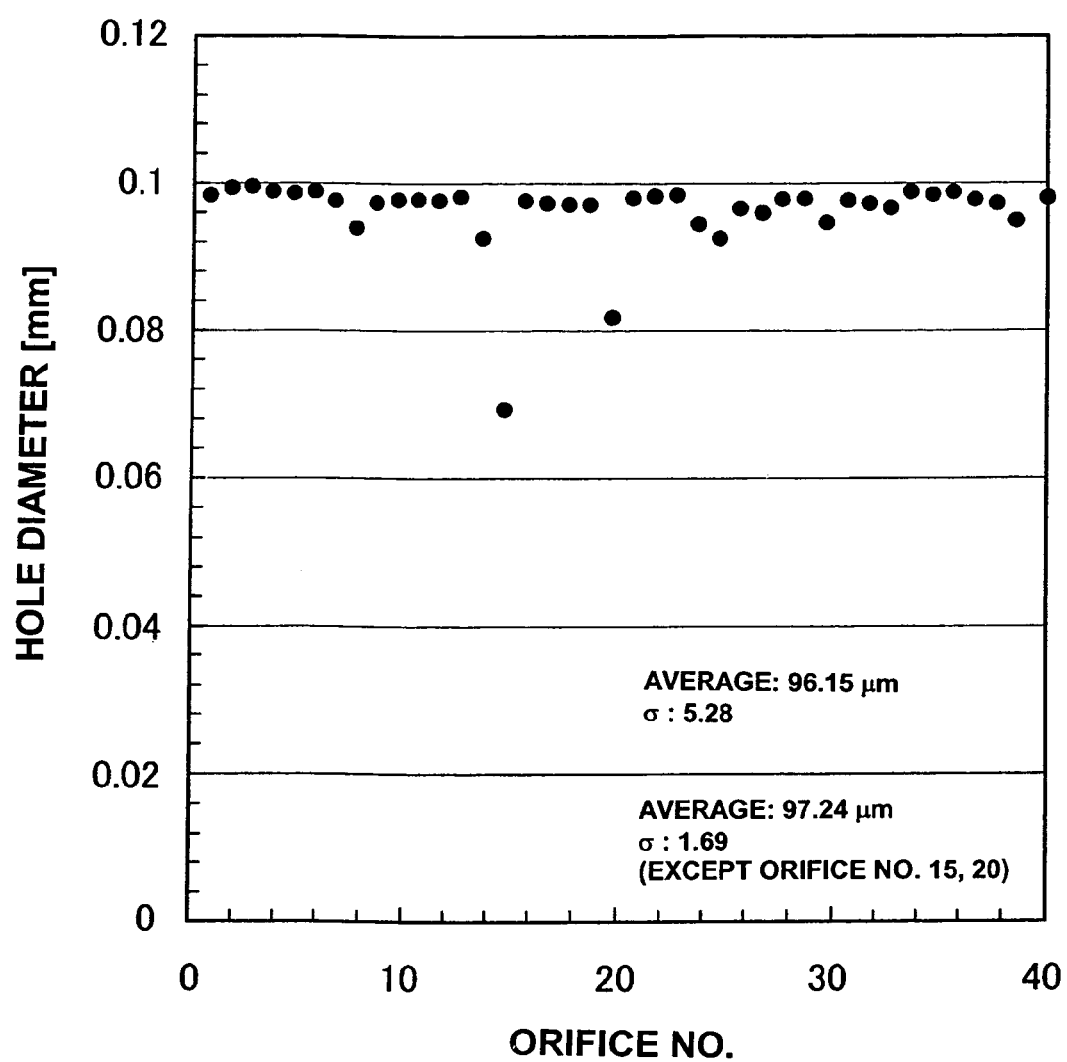
FIG. 5 is a graph showing the results calculated using the experimental formula A=Cv×17/0;8 from the test results shown in FIG. 1.

FIG. 5 shows the results obtained when the hole diameters φ (mm) of the respective small holes 8 were determined from the effective cross-sectional areas A (mm$^2$) of the respective small holes calculated using Equation (4) described above from the measured values of the air flow rate shown in FIG. 4. The mean hole diameter for a total of 40 small holes 8 was 96. 15 μm (standard deviation σ=5.28); and when the small holes 8 of No. 15 and No. 20 (which showed an aberration in the hole diameter φ(mm) from the time of manufacture) were excluded, the calculated mean diameter of the small holes 8 was 97.24 μm (standard deviation σ=1.69).

More specifically, in the present invention, it was determined that the flow rate of air flowing through the respective small holes 8 in the plate 7 can be reproducibly measured with an error of ±1 sccm or better by causing the air to flow through these small holes 8 under critical conditions and by performing air flow rate measurements using an automatic pressure control device 4 and a thermal quantity type mass flow controller 3.

Furthermore, in the present invention, by using Equation (4) derived from Equation (2) and Equation (3), it was possible to calculate the hole diameters of the respective small holes 8 as a mean value of 97.2 μm with a standard deviation of 1.69, so that even if the actual mean hole diameter was assumed to be 100 μm, it was possible to calculate the hole diameters of the respective small holes with a mean error of 2.3 μm.

Moreover, the fact that variation in the hole diameter between the respective small holes 8 could also be sufficiently confirmed by the present invention was demonstrated by measurement tests of the small hole gas flow rate and the like using the above-described test apparatus shown in FIG. 1.

Figure 6:
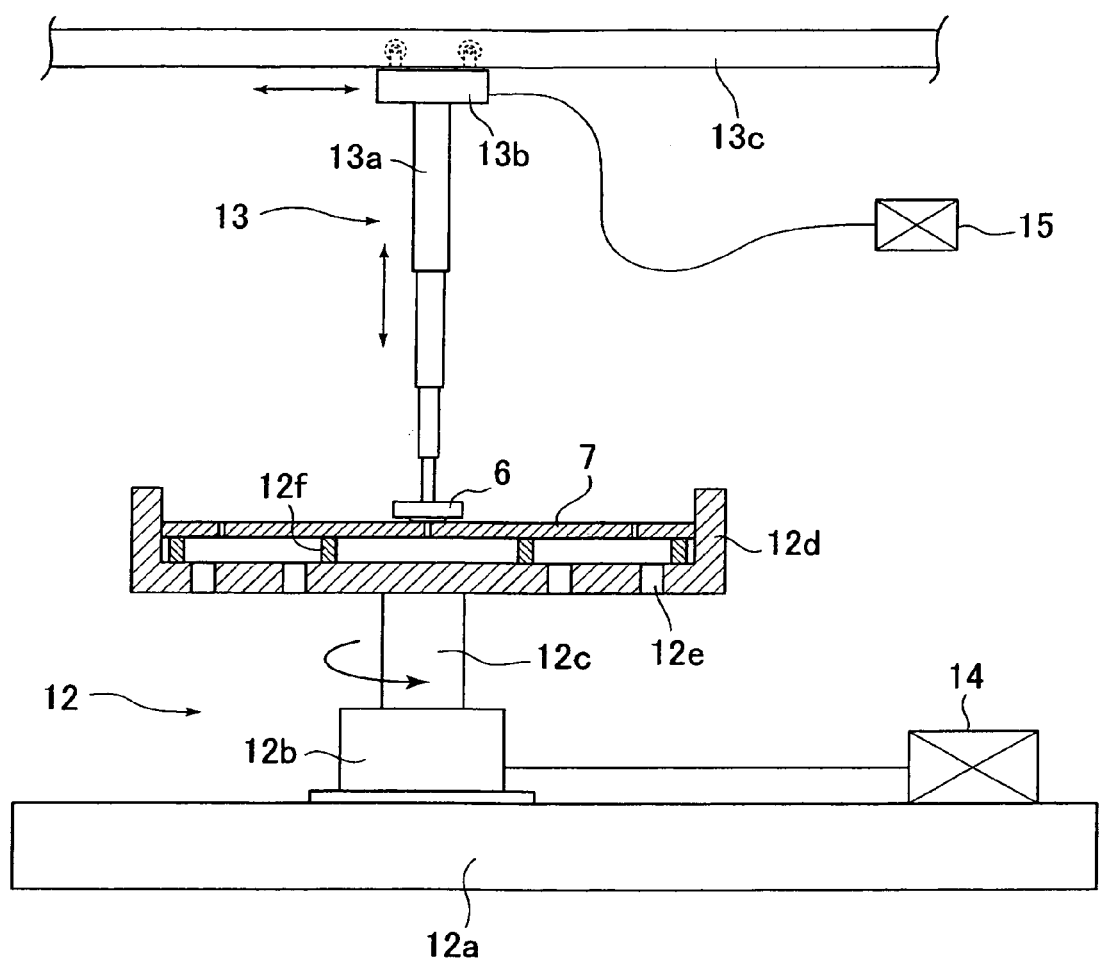
FIG. 6 is an outline view of the plate supporting device and test probe supporting device.

FIG. 6 is an outline view of the plate supporting device 12 and the test probe supporting device 13 used in the small hole diameter measurement system of the present invention.

The above-described plate supporting device 12 is comprised of a motor supporting stand 12a, a rotational driving motor 12b, a motor rotating shaft 12c, a plate carrier 12d, a motor control panel 14, and the like. With the plate 7 being supported in a horizontal attitude on the carrier 12d, the carrier 12d is intermittently rotationally driven a specified angle at a time by control signals from the motor control panel 14 via the rotational driving motor 12b.

The above-described test probe supporting device 13 is comprised of a probe supporting body 13a that expands and contracts in telescoping form, a car 13b that causes the probe supporting body 13a to move, a guide rail 13c for the car 13b, a test probe control device 15, and the like. The test probe 6 is fastened to the tip end of the probe supporting body 13a.

The above-described probe supporting body 13a is caused to move arbitrarily in the left-right direction by causing the car 13b to move in accordance with control signals from the test probe control device 15. Furthermore, the probe supporting body 13a is appropriately extended or retracted into a specified position by means of an inserted cylinder device (not shown), so that the test probe 6 on the tip end is pressed against the surface of the plate 7, thus supplying an air current to the respective small holes 8.

By way of appropriately combining the movement of the probe supporting body 13a in the horizontal direction and the intermittent rotation of the plate carrier 12d, the test probe 6 contacts all of the small holes 8 (that are formed in the plate 7 in a concentric pattern) in an air-tight manner.

In FIG. 6, 12e indicates air vent holes, and 12f indicates cushion carriers.

Figure 7:
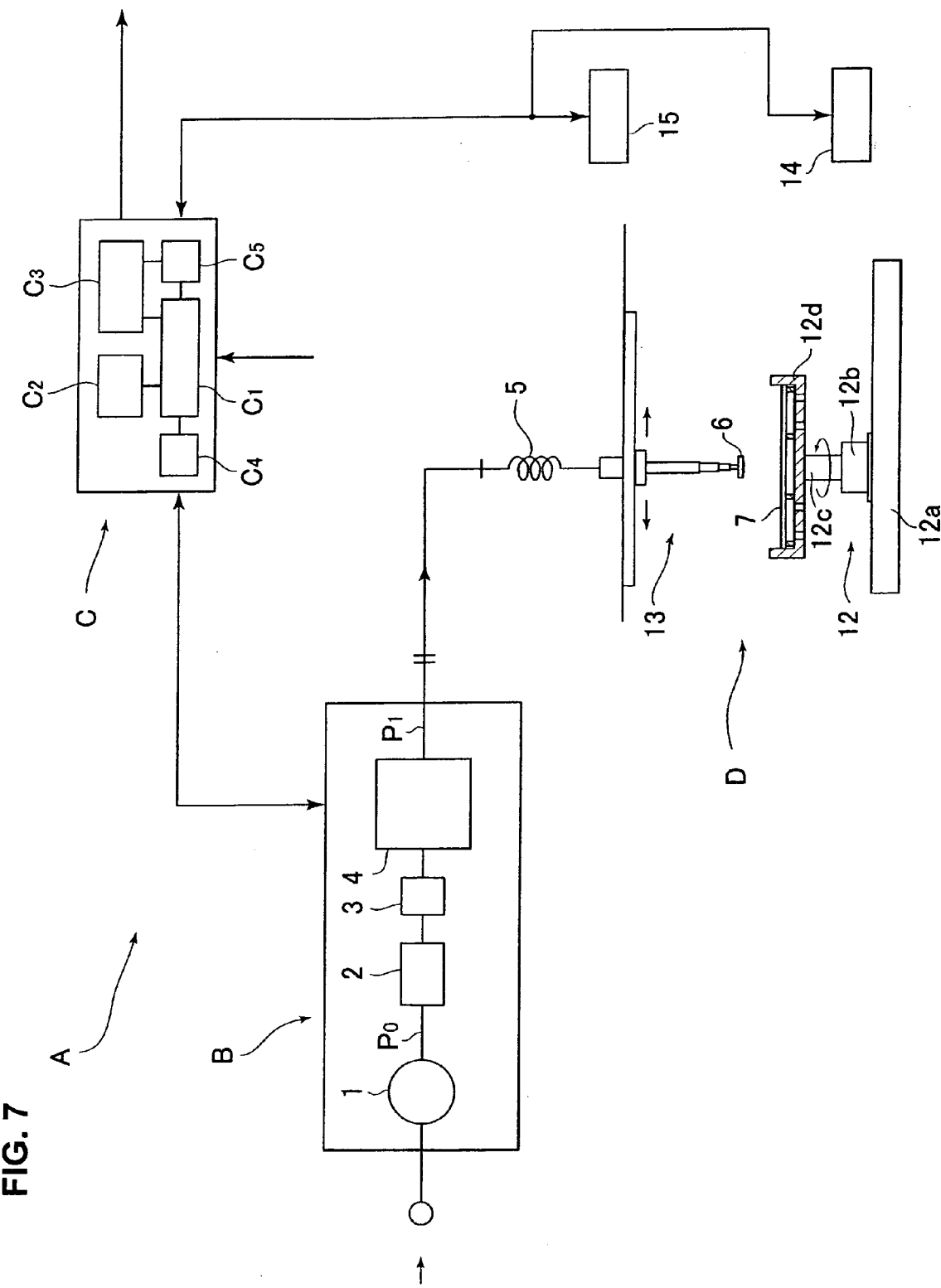
Figure 8:
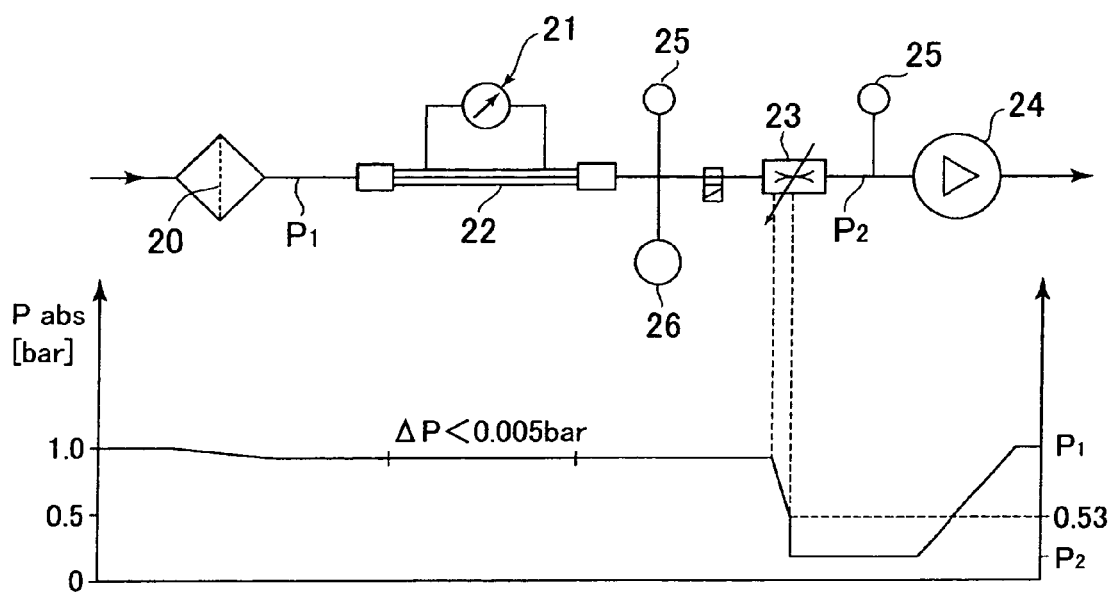
FIG. 8 is an explanatory diagram of a conventional small hole diameter measurement method.

FIG. 7 is an overall system diagram showing an embodiment of the plate small hole diameter automatic measurement system of the present invention. In FIG. 7, A indicates a small hole diameter automatic measuring device, B indicates a flow rate measurement section, C indicates a control section, and D indicates a plate holding section.

The plate small hole diameter automatic measuring device A is comprised of the flow rate measurement section B, control section C, plate holding section D, and the like.

Furthermore, as described above, the flow rate measurement section B is comprised of a pressure adjustment device 1, a filter 2, an automatic pressure control device main body 4, and the like.

Moreover, the control section C is comprised of a setting part $C_1$, a calculation and judgment part $C_2$, an external output part $C_3$, a power supply part $C_4$, a display part $C_5$, and the like; and the plate holding section D is comprised of a plate supporting device 12, a test probe supporting device 13, a motor control device 14, a test probe control device 15, and the like.

Since the respective constituent members of the flow rate measurement section B and plate holding section D in FIG. 7 are the same as those described in FIGS. 1, 6, and the like, a description of these members is omitted here.

The control section C mainly controls the flow rate measurement section B and plate holding section D; and necessary information, such as the air pressure values $P_0$ and $P_1$ of the flow rate measurement section B, the designation of the controlled pressure range of the automatic pressure control device 4, information relating to the small holes 8 in the plate 7 constituting the object of inspection, order of measurement of the hole diameters, standard value for discriminating the hole diameter, calculation formula for the effective cross-sectional area A of the small holes, is inputted into the setting part $C_1$ of this control section.

Furthermore, a comparison of the calculated and standard values of the small hole diameters and the like are performed in the calculation and judgment part $C_2$ on the basis of measured flow rate measurement value signals from the thermal quantity type mass flow controller 3 of the flow rate measurement section B, and the results are transmitted to the outside of the control section via the external output part $C_3$ and displayed on the display part $C_5$.

Furthermore, control signals are sent to the respective control devices 14 and 15 of the plate holding section D from the control section C, so that the raising and lowering of the test probe 6, the rotational angle of the plate carrier 12d, and the like are controlled.

The present invention is mainly used to check orifice hole diameters in shower plates used inside process chambers for the manufacture of semiconductors. However, as long as the plate involved is a plate of the type in which a plurality of small holes are formed in a round or square plate-form body, and a fluid such as a gas is supplied via some or all of these small holes, the present invention is applicable even if the plate is a plate that is used outside the field of semiconductor manufacturing devices, or even if the plate is used in a location other than the interior of a process chamber. Accordingly, the present invention can be utilized on plates that are used in chemical apparatuses or general industrial equipment.

The invention claimed is:

1. A small hole diameter measuring apparatus for a plate which successively and continuously measures diameters of a plurality of small holes formed in a plate, said small hole diameter measuring apparatus for a plate comprising:

a flow rate measurement section (B) substantially comprising an automatic pressure control device (4) which supplies a fluid to an inlet side of small holes (8) in a plate (7) while maintaining an outlet-side pressure $P_2$ of said small holes (8) and an inlet-side pressure $P_1$ of said small holes (8) in a critical state of the fluid and while controlling the inlet-side pressure $P_1$ to a desired predetermined inlet-side pressure $P_1$;

a plate holding section (D) which is comprised of:
  a plate supporting device (12) which holds said plate (7) so that said plate (7) is free to rotate,
  a test probe supporting device (13) which is provided above said plate supporting device (12) and supports a test probe (6) that is in air-tight contact with said inlet side of said small holes (8) and that supplies a fluid from said flow rate measurement section (B), so that said test probe (6) can be freely raised and lowered and freely moved in a horizontal direction, and
  control devices (14) and (15) for both of said supporting devices (12) and (13); and
a control section (C) which is comprised of:
  a calculation and judgment part ($C_2$) which calculates a hole diameter or a cross-sectional area of said small holes (8) during a supply of the fluid on the basis of a measured value of a flow rate from said flow rate measurement section (B), and
  an external output part ($C_3$) which outputs a calculated value to outside of said control section.

2. The small hole diameter measuring apparatus for a plate according to claim 1, wherein said calculation and judgment part ($C_2$) of said control section (C) calculates a cross-sectional area (A) of said small holes (8) using a numerical formula:

$$A = Qg \cdot (Gg \cdot T)^{1/2} \cdot 17/(203 \cdot P_1 \, 19 \, \alpha o)$$

wherein, Qg is a supply rate ($Nm^3/h$) of the fluid to said small holes converted into a standard state, $P_1$ is an absolute pressure ($kgf/cm^2$ abs) of the fluid on said inlet side of said small holes, T is a temperature (K) of the fluid, Gg is a specific gravity of the fluid, and $\alpha o$ is a contraction coefficient of the fluid.

3. The small hole diameter measuring apparatus for a plate according to claim 1 or 2, wherein the fluid is nitrogen or air, and the contraction coefficient $\alpha o$ is 0.8.

4. The small hole diameter measuring apparatus for a plate according to claim 1, wherein said plate supporting device (12) is structured so that said outlet side of said small holes (8) in said plate (7) is open to atmosphere.

5. The small hole diameter measuring apparatus for a plate according to claim 1, wherein said plate supporting device (12) is comprised of:
  a plate carrier (12d);
  a rotational driving motor (12b) that causes said plate carrier (12d) to rotate intermittently by a specified angular pitch; and
  a motor control device (14) that controls driving of said rotational driving motor (12b).

6. The small hole diameter measuring apparatus for a plate according to claim 1, wherein said test probe supporting device (13) is comprised of:
  a car (13b) which is supported on a supporting rail (13c) so as to be free to move;
  a probe supporting body (13a) which can be extended and retracted in a telescoping form and whose upper end portion is fastened to said car (13b); and
  a test probe (6) which is fastened to a lower end portion of said probe supporting body (13a).

7. The small hole diameter measuring apparatus for a plate according to claim 1, wherein said external output part ($C_3$) of said control section (C) outputs the measured value of the flow rate and the calculated value of the hole diameter or cross-sectional area to the outside.

8. The small hole diameter measuring apparatus for a plate according to claim 6, wherein said test probe (6) is comprised of:
  a holding body (6a);
  a retaining member (6b) that is fastened to said holding body (6a);
  a sealing member (6d) that is disposed on a lower end surface of said retaining member (6b); and
  a fluid passage (6e) that is formed in said retaining member (6b).

9. A small hole diameter measuring apparatus which measures diameters of small holes formed in a substrate, said small hole diameter measuring apparatus comprising:
  a pressure control means for supplying a fluid to an inlet side of said small holes at a desired inlet-side pressure $P_1$ while maintaining a pressure $P_2$ on an outlet side and the pressure $P_1$ on an inlet side of said small holes in a critical state of fluid;
  a flow rate measuring means for measuring a flow rate of fluid that is supplied to said inlet side of said small holes by said pressure control means; and
  a calculating means for calculating a cross-sectional area A of said small holes using a numerical formula:

$$A = Qg \cdot (Gg \cdot T)^{1/2} \cdot 17/(203 \cdot P_1 \cdot \alpha o)$$

wherein, Qg is a supply rate ($Nm^3/h$) of the fluid to said small holes converted into a standard state, $P_1$ is an absolute pressure ($kgf/cm^2$ abs) of the fluid on said inlet side of said small holes, T is a temperature (K) of the fluid, Gg is a specific gravity of the fluid, and $\alpha o$ is a contraction coefficient of the fluid.

10. The small hole diameter measuring apparatus according to claim 9, wherein said flow rate measuring means include a mass flow controller.

11. A small hole diameter measurement method for measuring diameters of small holes formed in a substrate, said small hole diameter measurement method comprising the steps of:
  supplying a fluid to an inlet side of said small holes at a desired inlet-side pressure $P_1$ by a pressure control means while maintaining a pressure $P_2$ on an outlet side and the pressure $P_1$ on an inlet side of said small holes in a critical state of fluid;
  measuring a flow rate of fluid that is supplied to said inlet side of said small holes by said pressure control means; and
  calculating a cross-sectional area A of said small holes using a numerical formula:

$$A = Qg \cdot (Gg \cdot T)^{1/2} \cdot 17/(203 \cdot P_1 \cdot \alpha o)$$

wherein, Qg is a supply rate ($Nm^3/h$) of the fluid to said small holes converted into a standard state, $P_1$ is an absolute pressure ($kgf/cm^2$ abs) of the fluid on said inlet side of said small holes, T is a temperature (K) of the fluid, (Gg is a specific gravity of the fluid, and $\alpha o$ is a contraction coefficient of the fluid.

12. The small hole diameter measurement method according to claim 11, wherein said measurement of the flow rate is performed using at least a mass flow controller.

13. A shower plate manufacturing method, comprising the steps of:
  forming a specified number of small holes equal to or greater than two with a specified diameter in a specified portion of a plate; and measuring diameters of said small holes using the small hole diameter measuring apparatus according to any one of claims 2 and 4 through 10.

14. A shower plate manufacturing method, comprising the steps of:

forming a specified number of small holes equal to or greater than two with a specified diameter in a specified portion of a plate; and measuring diameters of said small holes using the small hole diameter measurement method according to any one of claims 11 and 12.

15. The shower plate manufacturing method according to claim 13, further comprising the step of:

determining whether or not a variation in opening diameter of said specified number of small holes is within a specified range by measuring the hole diameters.

16. A shower plate which is manufactured by the manufacturing method according to claim 15.

17. The shower plate manufacturing method according to claim 14, further comprising the step of:

determining whether or not a variation in opening diameter of said specified number of small holes is within a specified range by measuring the hole diameters.

* * * * *